United States Patent
Evans

(10) Patent No.: US 7,232,336 B1
(45) Date of Patent: Jun. 19, 2007

(54) MULTIPURPOSE CONNECTION BOX FOR ELECTRICAL MODULES

(76) Inventor: Larry Douglas Evans, 1030 C&E Dr., Tignall, GA (US) 30668

( * ) Notice: Subject to any disclaimer, the term of this patent is extended or adjusted under 35 U.S.C. 154(b) by 0 days.

(21) Appl. No.: 11/545,304

(22) Filed: Oct. 10, 2006

Related U.S. Application Data

(63) Continuation-in-part of application No. 11/110,563, filed on Apr. 20, 2005, now abandoned.

(51) Int. Cl.
*H01R 13/60* (2006.01)

(52) U.S. Cl. .................. 439/535; 439/536; 439/537

(58) Field of Classification Search ........ 439/535–539, 439/215; 174/66–67, 50
See application file for complete search history.

(56) References Cited

U.S. PATENT DOCUMENTS

| | | |
|---|---|---|
| 3,707,697 A | 12/1972 | Izumi |
| 4,117,258 A | 9/1978 | Shanker |
| 4,500,746 A | 2/1985 | Meehan |
| 4,636,914 A | 1/1987 | Belli |
| 4,669,804 A | 6/1987 | Munroe |
| 4,918,258 A | 4/1990 | Ayer |
| 4,993,970 A * | 2/1991 | Littrell ................. 439/535 |
| 5,223,673 A | 6/1993 | Mason |
| 5,290,175 A * | 3/1994 | Robinson et al. ........ 439/540.1 |
| 5,900,583 A * | 5/1999 | Russo ................. 174/61 |
| 5,920,034 A | 7/1999 | Saka et al. |
| 5,934,935 A * | 8/1999 | Kameyama ............. 439/535 |
| 6,229,087 B1 | 5/2001 | Archer |
| 6,259,023 B1 | 7/2001 | Reiker |
| 6,379,164 B1 | 4/2002 | Cash, Jr. |
| 6,623,296 B2 * | 9/2003 | Okamoto ............... 439/536 |
| 6,730,844 B2 | 5/2004 | Reiker |
| 6,786,766 B1 | 9/2004 | Chopra |

* cited by examiner

*Primary Examiner*—Xuong Chung-Trans
(74) *Attorney, Agent, or Firm*—Michael A. Mann; Nexsen Pruet, LLC

(57) ABSTRACT

A multipurpose connection box for connecting an electrical energy source to at least two different function modules having different electrical functions. Each function module has a different arrangement of male prongs and the connection box has corresponding terminals for receiving those prongs for plugging in either of the function modules one at a time. The terminals include serrated clamping jaws for penetrating insulated wires to provide electrical contact without removal of the insulation. The connection box may include features for mounting modules supporting ceiling fixtures.

30 Claims, 9 Drawing Sheets

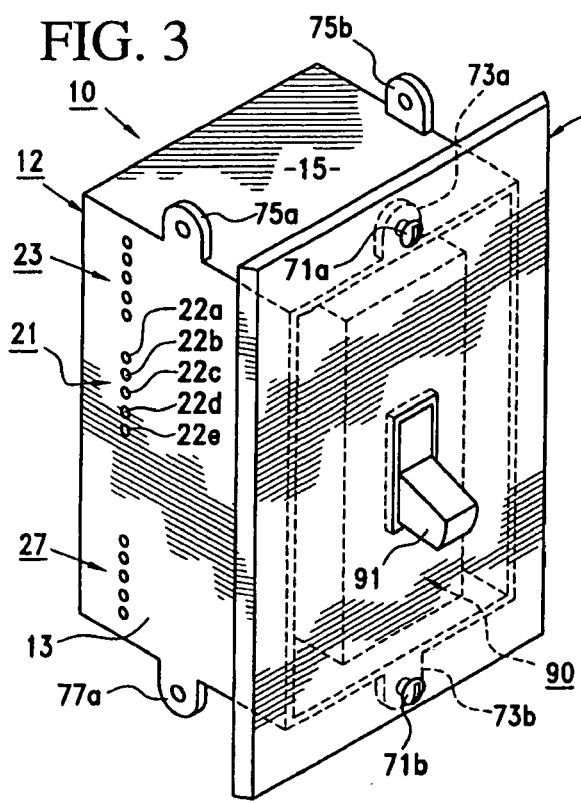
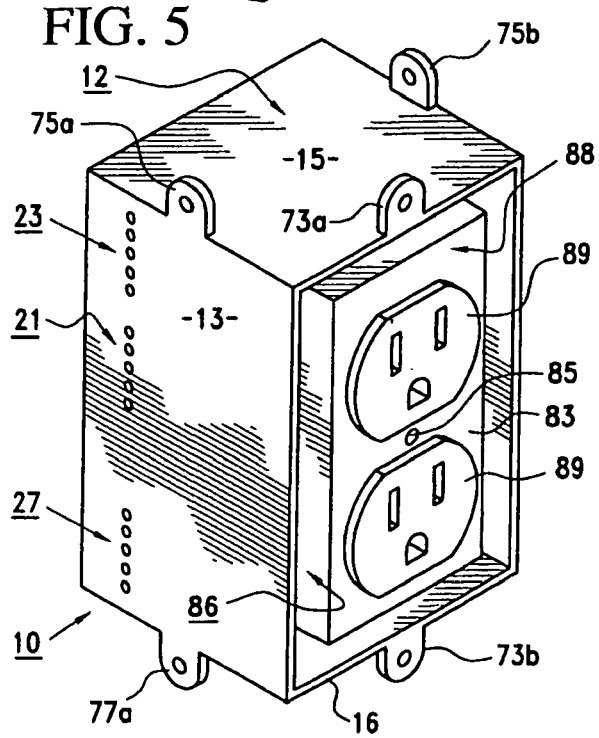
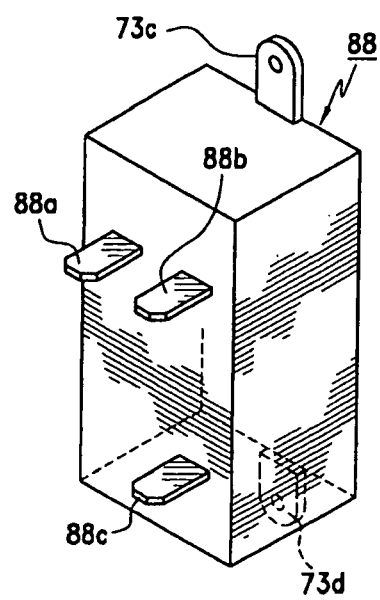

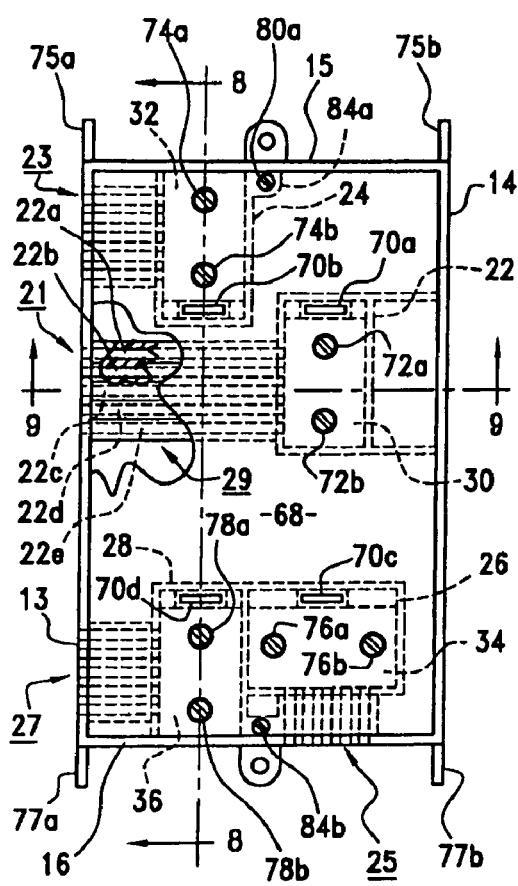
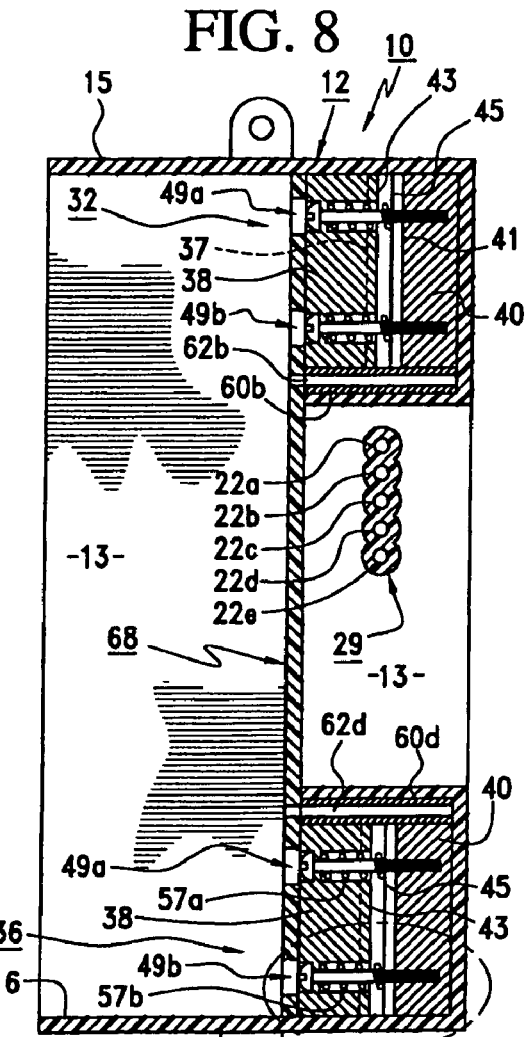
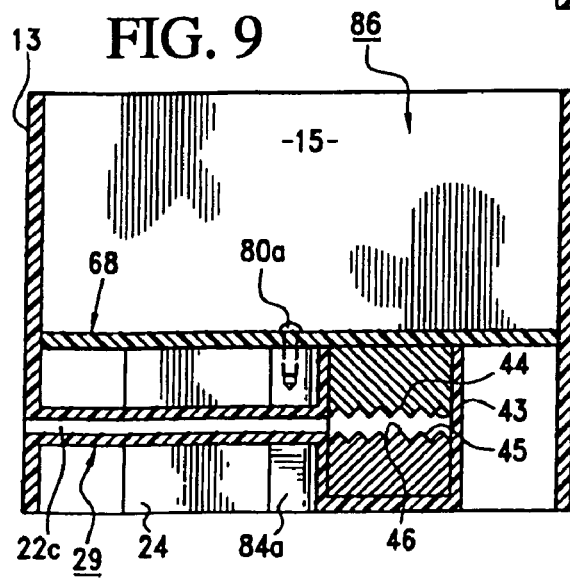
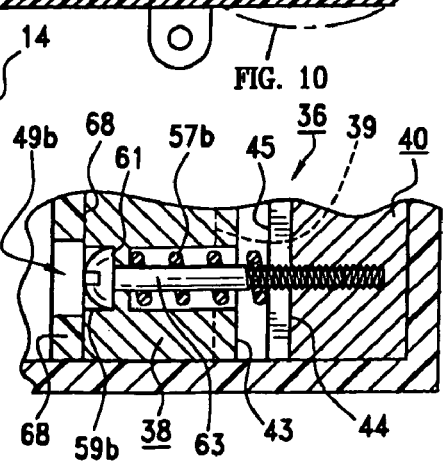

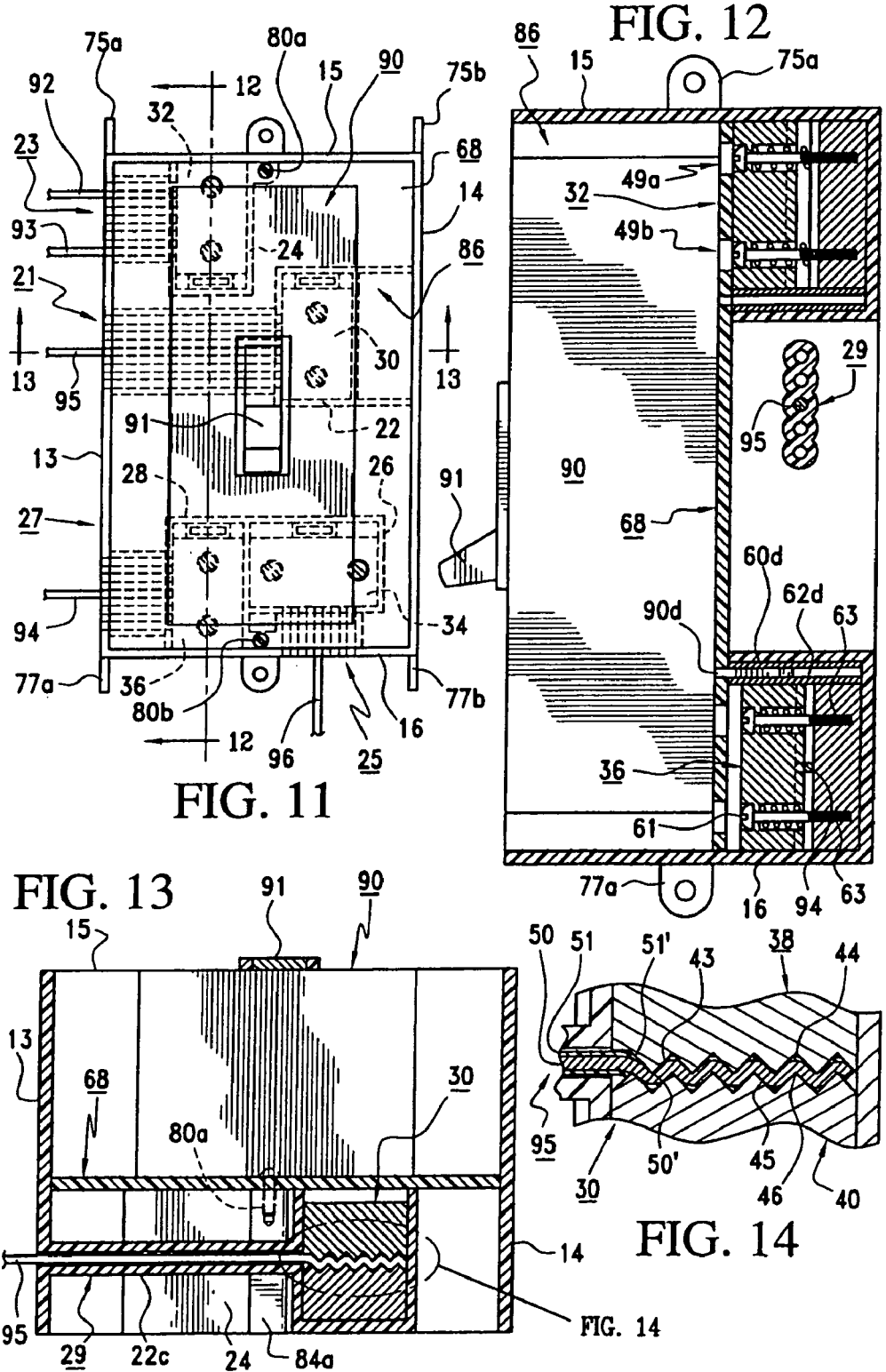

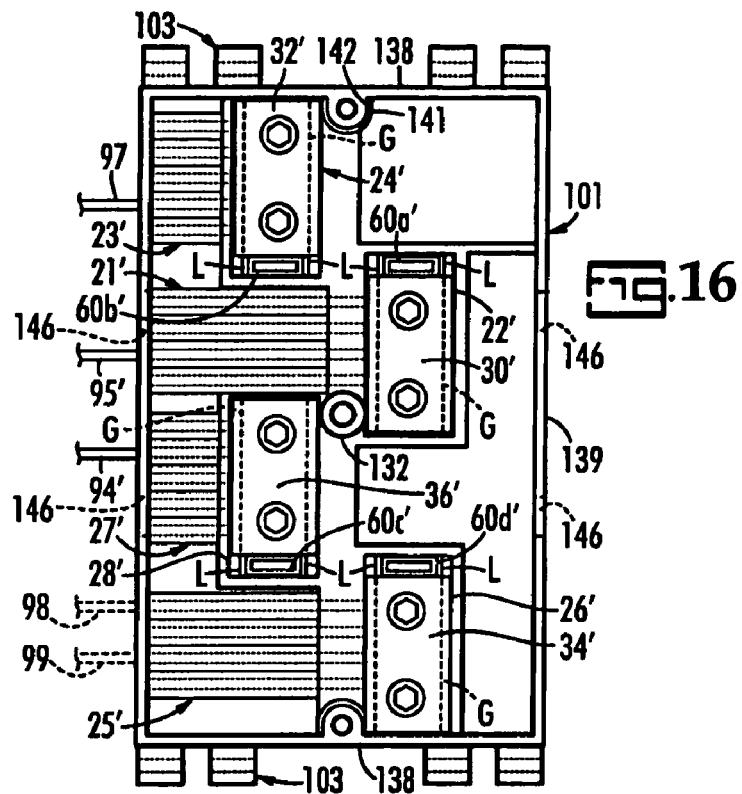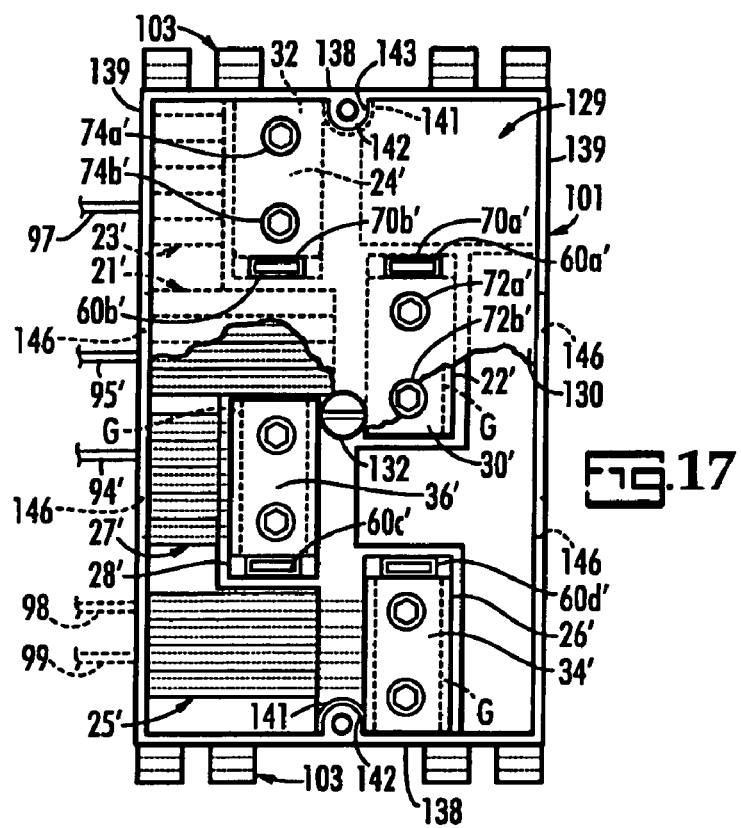

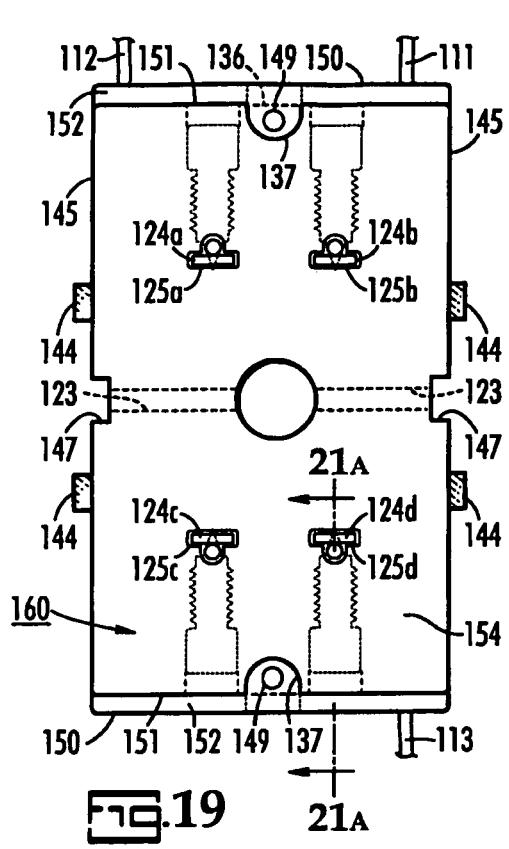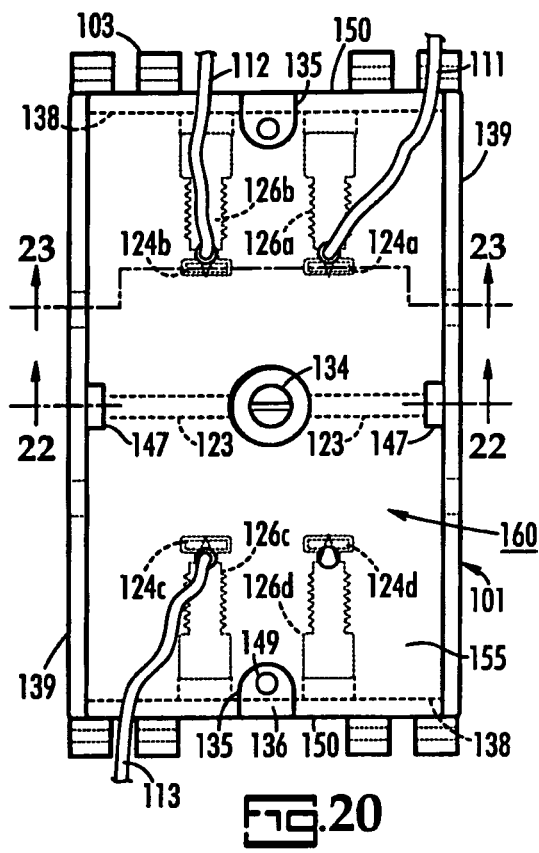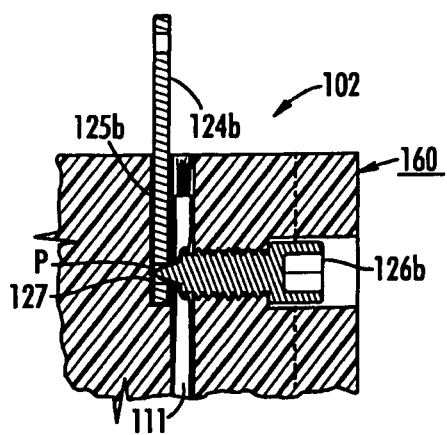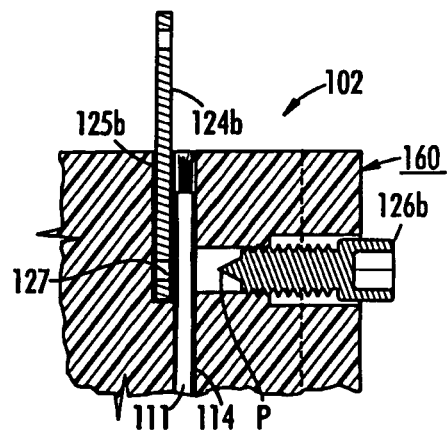

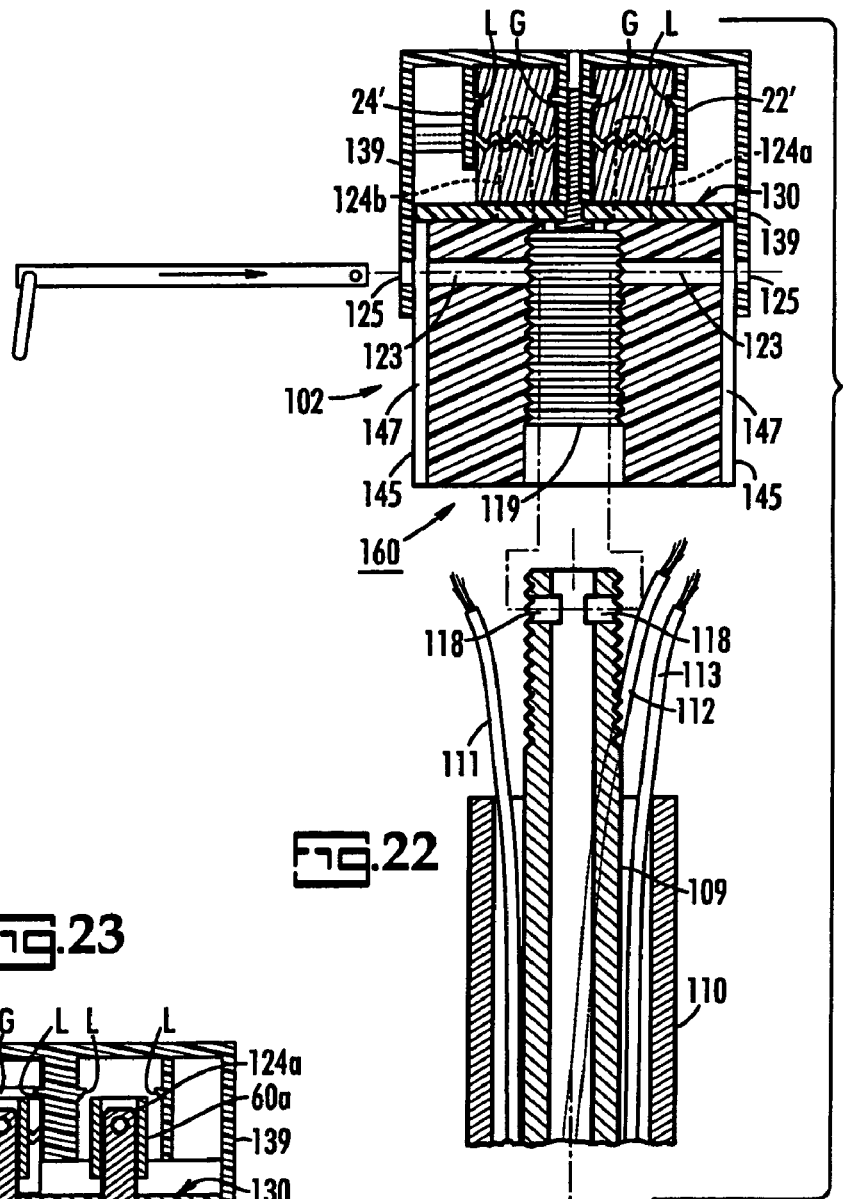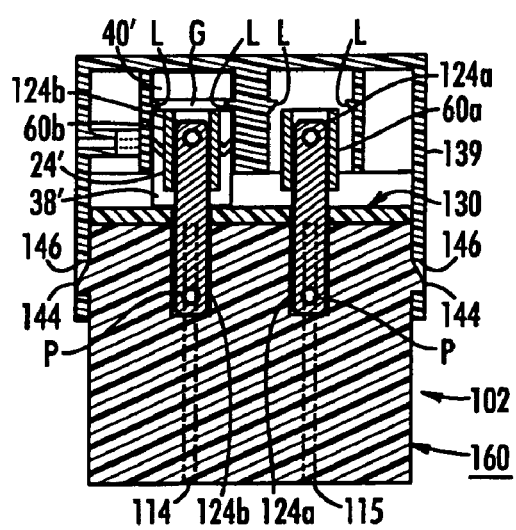

MULTIPURPOSE CONNECTION BOX FOR ELECTRICAL MODULES

RELATED APPLICATIONS

This application is a Continuation-In-Part of application Ser. No. 11/110,563 filed Apr. 20, 2005 now abandoned, the entire contents of which are incorporated herein by reference.

FIELD OF THE INVENTION

This invention relates to electrical boxes in which switches, outlet receptacles, wiring junctions, fan fixtures, light fixtures and other circuit components and fixtures may be mounted for connection to electrical circuits providing electrical power. More specifically, the invention relates to a multipurpose connection box into which corresponding electrical modules may be plugged, i.e., an electrical box for plug-in modular switches, outlet receptacles, wiring junctions, fan fixtures, light fixtures, and other circuit components and fixtures.

BACKGROUND OF THE INVENTION

Conventional wiring systems include large circuit breaker panels from which wires for electrical circuits are routed to smaller electrical boxes that may be nailed between the studs and joists of a house, office building or other structure to provide electrical power at various locations in each room of the structure. Then, electrical switches, dual outlet receptacles, wiring junctions and other functional circuit assemblies are mounted in these small electrical boxes and connected to wires of electrical circuits within the structure.

To attach an electrical wire to a conventional function assembly, the electrical wire is passed through an opening in the box, the end of the wire is stripped of its insulation, and then the stripped end is bent around a screw of an assembly contact and secured into place by tightening the screw. The functional assembly is then pushed back into the box where it is retained by passing screws through a flange of the assembly and into a corresponding flange of the box. Similarly, where a conventional box is used to form a junction between input and output electrical wires, the respective wires may be inserted into the box through opposing openings in the sides thereof, then pulled out, stripped and twisted together by means of wire nuts, and then pushed back into the box so as to be secured therein by a cover.

In order to change a previously installed switch, outlet or other assembly in a conventional box, it is necessary to remove the box cover, then pull out the old assembly with the wires attached thereto, then detach the wires from the old assembly and reattach them to the new assembly, and then push the new assembly back in the box and secure it therein as previously described. During this changing of assemblies, the power to the box must be turned off in order to avoid the possibility of an electrical shock should the installer inadvertently touch a live wire or component that is exposed during the changing process.

SUMMARY OF THE INVENTION

The present invention provides a multipurpose connection box for mounting one at a time (alternatively) two or more different function modules and connecting the mounted module to an electrical energy source. These "different" function modules have different electrical functions, such as a dual outlet module on the one hand and an electrical switch module on the other hand. The function modules may include specialty modules, such as a ceiling fan and/or light fixture module made according to a modified embodiment of the invention. In addition, the connection box may serve as a junction box between two or more electrical circuits, while at the same time providing a mounting and electrical connection for a function module.

The connection box includes a housing that provides an outer compartment for receiving the different function modules one at a time. Multiple inner compartments are provided in the housing each for receiving a corresponding electrical conductive terminal having jaw-like clamping members with teeth for penetrating the electrical insulation and gripping the electrical conductor of conventional electric wires without the necessity of first removing the insulation.

The clamping terminals each include a female contact having a socket for receiving a corresponding male prong contact on the function module. Different function modules have different prong arrangements depending on its particular function, and the number and arrangement of clamping terminals correspond to the total number and different arrangements of prongs for the particular combination of different modules for which the multipurpose connection box is designed. It is also contemplated that the electrical contacts carried by the function modules and by the clamping terminals may reversed so that prong contacts are carried by the clamping terminals and corresponding female contacts are carried by the function modules.

The clamping terminals are held in place within their inner compartments by an intermediate plate separating these terminal compartments from the outer module receiving compartment, and this plate includes prong passing apertures aligned with sockets of the female contact members. The plate also has apertures for passing a screwdriver or other tool for tightening screws that actuate clamping movements of the jaws of each clamping terminal after wires have been inserted between these jaws transversely across the longitudinally extending teeth thereof.

The female contact members are rigidly fixed to only the inner jaws of the clamping terminals so that the outer jaws are free to reciprocate relative to the inner jaws in response to tightening and loosening of the screws, the outer jaws being biased away from the inner jaws by a spring associated with each screw, and the inner jaws being secured in place within the compartments by suitable means such as an adhesive or one or more molded lips, ridges or other projections that snap over and firmly engage an edge or detent portion of the inner jaw.

A particular advantage of the invention is that each function module is merely plugged into a previously installed and fixed connection box in which the appropriate clamping terminals have been previously connected to corresponding electrical circuits, including a source of electrical power. Thus, a previously installed "plug-in" function module may be removed and replaced with a new plug-in function module merely by unplugging the prior module and plugging in the replacement module without the necessity of turning off electrical power to the connection box or handling hot electrical wires or other components.

The new plug-in function module may be the same as the previous module, or it may be a different module having a different function but an arrangement of male prongs that matches the existing connection box arrangement of female contact members. Additional advantages of the invention include easily used modular electrical boxes for wiring residential and commercial buildings that may be connected to insulated wires without stripping off insulation from the wire ends being connected to terminals within the box, and that may be quickly and easily connected to those terminals without the use of splicing or wire screws or nuts.

BRIEF DESCRIPTION OF THE DRAWINGS

The structure, operation and advantages of the invention may be further understood from the following detailed description taken in conjunction with the accompanying drawings, in which:

FIG. 3 is a perspective elevational view showing the electrical box of FIG. 1 with a switch module installed therein;

FIG. 4 is a perspective view showing the switch module as removed from the assembly of FIG. 3:

FIG. 5 is a perspective elevational view showing the electrical box of FIG. 1 with a dual outlet module installed therein;

FIG. 6 is a perspective view showing the outlet module as removed from the assembly of FIG. 5;

FIG. 7 is a front partial sectional view in elevation of the multipurpose electrical box of FIG. 1;

FIG. 8 is a cross-sectional view taken along line 8-8 of FIG. 7;

FIG. 9 is a cross-sectional view taken along line 9-9 of FIG. 7;

FIG. 10 is a fragmentary cross-sectional view of a detail identified by a broken-line oval 10 in FIG. 8;

FIG. 11 is an elevational front view of the switch assembly of FIG. 3 with the cover removed and the electrical box connected to electrical wires;

FIG. 12 is a cross-sectional view taken along line 12-12 of FIG. 11;

FIG. 13 is a cross-sectional view taken along line 13-13 of FIG. 11;

FIG. 14 is a fragmentary cross-sectional view of a detail identified by a broken-line oval 14 in FIG. 13.

FIG. 16 is a bottom view showing the interior of the multipurpose electrical box of FIG. 15 with the speciality module and an intermediate plate removed;

FIG. 17 is a bottom view of the interior of the electrical box similar to FIG. 16 but showing a fragment of the intermediate plate for covering the electrical terminals;

FIG. 19 is a top view of the speciality module of FIG. 15;

FIG. 20 is a bottom view of the speciality module and the modified connection box FIG. 15;

FIG. 21A is fragmentary cross-sectional view along the section line 21A-21A of in FIG. 19, and FIG. 21B is a similar fragmentary cross-sectional view to illustrate movement of a wire piercing screw to connect a wire to a module prong;

FIG. 22 is an exploded elevational end view in section along line 22-22 of FIG. 20 showing the modified connection box of FIG. 15 with the speciality module installed therein, and illustrating installation in the module of the mounting rod for supporting the fan and light unit shown in FIG. 15; and, FIG. 23 is a sectional view along line 23-23 of FIG. 20 illustrating the connection of electrical wires shown in FIGS. 15 and 22 to connection box terminals via module prongs.

DETAILED DESCRIPTION OF PREFERRED EMBODIMENT

Figures 1, 2:
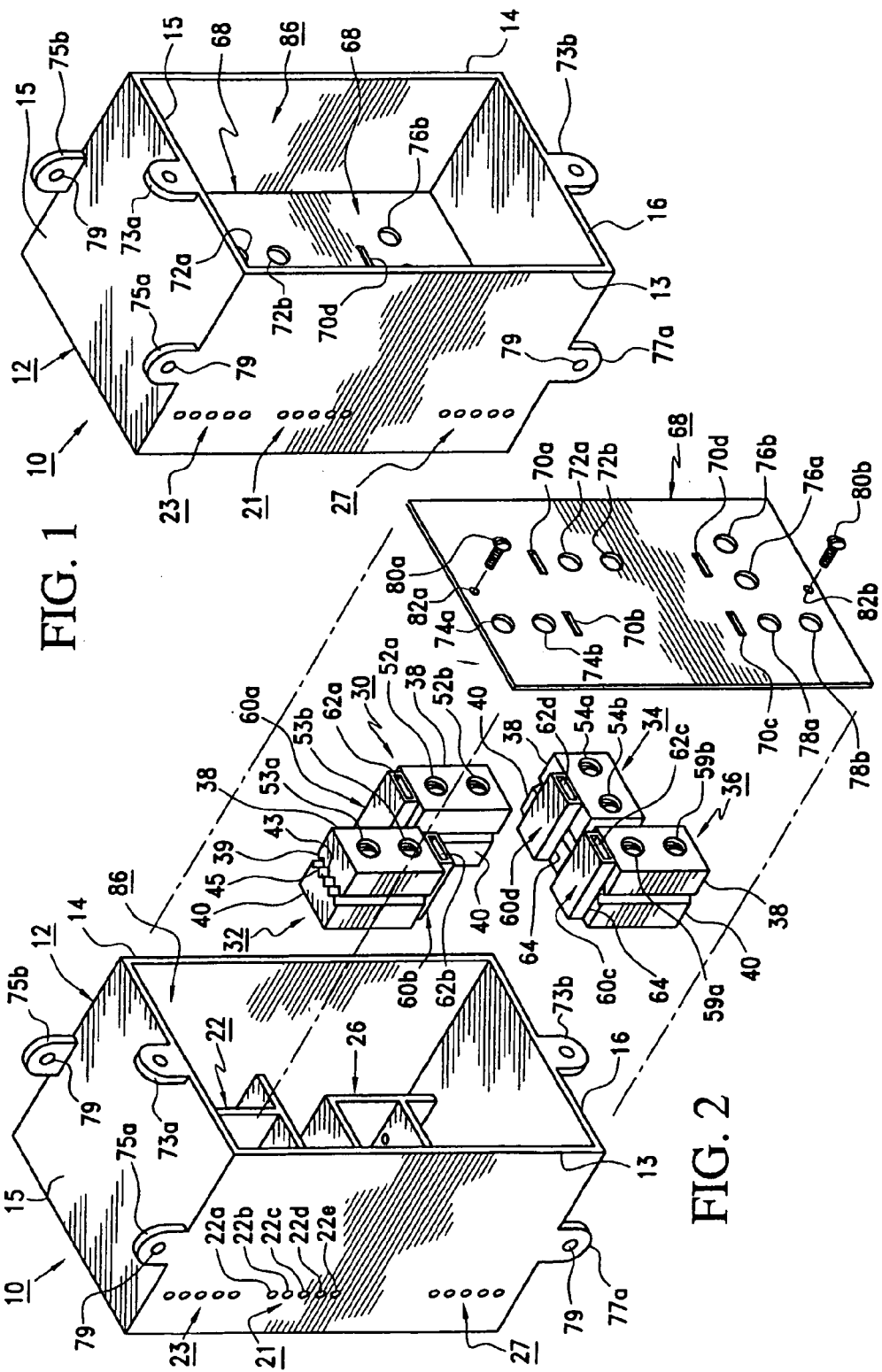
FIG. 1 is a perspective elevational view of a multipurpose electrical connection box according to the invention wherein assembled components are ready to receive a plug-in function module.
FIG. 2 is an exploded perspective view showing individual components that are in the assembled electrical box of FIG. 1.

Referring now to the drawings, wherein like numerals indicate like elements throughout the several figures, there is shown in FIGS. 1 and 2 a multipurpose connection box 10 having a box-like housing 12 made of an electrical insulating material and having two sidewalls 13 and 14 and two end walls 15 and 16. Within the housing 12, interior walls define at least four inner compartments 22, 24, 26 and 28 containing electrical contacts in the form of wire clamping terminals, generally designated 30, 32, 34, and 36, respectively. Only by way of example to facilitate the explanation below, terminal 30 is designated as "hot", terminal 32 is designated as "common" or "neutral", terminal 34 is designated as "auxiliary", and terminal 36 is designated as "ground". The components of each of these terminals is made of a metal, such as copper or brass, or some other electrically conductive material. Since the clamping terminals are essentially identical, except for the positioning of the female contact members, only one will be described in detail below.

Referring to FIGS. 8-10 and 14, each clamping terminal has an outer jaw member 38 with a clamping surface 37 and an inner jaw member 40 with a clamping surface 41. Outer surface 37 is preferably serrated by having teeth 43 formed by longitudinal extending peaks and longitudinally extending valleys. Preferably, inner surface 41 is similarly serrated by having teeth 45 also formed of longitudinally extending peaks and longitudinally extended valleys. Surface 37 is arranged opposite to surface 41 so that the teeth of each clamping member meshes with the teeth of the other clamping member—for example, valleys 44 of teeth 43 are aligned with peaks 46 of teeth 45 (FIGS. 9 and 14).

Each terminal compartment communicates with an exterior surface of housing 12 by a plurality, preferably 4 or 5, of separate wire guide passages for separately guiding and introducing of multiple wires in between the jaw members of the clamping terminals. For example, a set 21 of multiple passages 22a, 22b, 22c, 22d and 22e pass through housing sidewall 13 and a connecting transom 29 into inner compartment 22 as may be seen best in FIGS. 7-9. These guide passages, as well as the corresponding guide passages of the other multiple passage sets 23, 25 and 27 that lead to the other inner terminal compartments 24, 26 and 28, respectively, are aligned with the compartment and the inner jaw member therein to feed and guide the electrical wires, such as wire 95 in FIGS. 11-14, between the outer jaw 38 and the inner jaw 40 so that each wire extends transversely across the elongated jaw teeth 43 and 45. As shown in FIGS. 9, 13 and 14, the lower jaw of each of the terminals is positioned just below and adjacent to the outlets of the wire passages so that the peaks of its teeth do not obstruct passage of the wires transversely between the lower and upper jaws. The lower jaws are secured in this innermost position within their respective compartments by any suitable means, such as by an adhesive.

It follows from the foregoing that the screws 49a and 49b provide means for pressing the clamping members or jaws 38 and 40 together to bring their respective clamping surfaces 37 and 41 into clamping engagement with one or more separate electrical wires guided therebetween by the sets 21, 23, 25 and 27 of multiple passages corresponding respectively to the inner compartments 22, 24, 26 and 28. In this embodiment, an adhesive is preferably used as a fixing means for fixing each of the inner clamping members in its fixed position within the inner or bottom portion of its compartment. The screws 49a and 49b also provide attaching means for attaching each outer clamping member 38 to its corresponding inner clamping member 40 for reciprocal movement relative thereto between a retracted position for wire insertion and a clamping position for wire gripping (engagement).

In other words, the housing 12 provides a plurality of wire guide passages of which at least one corresponds to each of the inner compartments 22, 24, 26 and 28 and extends from an exterior surface of the housing to its corresponding inner compartment for feeding and guiding an electrical wire from the exterior surface to between the clamping surfaces 37 and 41. Furthermore, the clamping surface 41 of inner clamping member 40 is aligned with the outlet end of the guide passage to guide an end portion of the electrical wire over and adjacent to inner clamping surface 41 when the outer clamping surface 37 is in a retracted position corresponding to the retracted position of outer clamping member 38. Preferably housing 12 includes a plurality of guide passage sets 21, 23, 25 and 27 each providing multiple guide passages (e.g., 22a, 22b, 22c, 22d and 22e) extending from the exterior housing surface to a corresponding inner compartment for separately feeding and guiding the end portions of multiple separate wires from the exterior surface to positions over and adjacent inner clamping surface 41 when outer clamping surface 37 is in its retracted position.

Referring now to FIGS. 10 and 12-14, the heads 61 of terminal screws 49a and 49b engage a shoulder of the outer jaw 38 and the screw shanks 63 are threaded into a threaded bore of the inner jaw 40 to provide clamping pressure sufficient for teeth 43 and 45 to penetrate an insulating covering or coating on each of the inwardly fed wires and electrically contact and bite into its metal conductor. This avoids having to strip insulation from the wire ends. For example, when these screws are tightened after insertion of electrical wire 95 between the inner and outer jaw members 40 and 38, the peaks 46 of teeth 43 and 45 bite through an insulating covering 51 (as at 51') and into a metal conductor 50 (as at 50') so as to be firmly engaged and in electrical contact with this conductor, which forms the conductive core of wire 95, as may be seen best in FIG. 14. Compressed springs 57a and 57b are positioned around the screws 49a and 49b, respectively, and these springs bias the jaws 38 and 40 apart so that clamping surfaces 37 and 41 will separate to release any wires clamped therebetween upon the loosening of screws 49a and 49b (FIGS. 8 and 10). The springs 57a and 57b are preferably identical, as are the screws 49a and 49b and screw passages 52a, 52b, 53a, 53b, 54a, 54b, 59a and 59b in terminals 30, 32, 34 and 36, respectively.

The clamping terminals 30, 32, 34 and 36 are held in their respective inner compartments 22, 24, 26 and 28 by a cover in the form of a plate member 68 made of an insulating material. Plate 68 has four prong slots 70a, 70b, 70c, and 70d aligned respectively with prong sockets 62a, 62b, 62c and 62d of female contact members 60a, 60b, 60c and 60d, respectively. Plate 68 also has a pair of apertures 72a and 72b aligned with a pair of screw passages 52a and 52b in clamping terminal 30, a pair of apertures 74a and 74b aligned with a pair of screw passages 53a and 53b in clamping terminal 32, a pair of apertures 76a and 76b aligned with a pair of screw passages 54a and 54b in clamping terminal 34, and a pair of apertures 78a and 78b aligned with a pair of screw passages 59a and 59b in clamping terminal 36. These aperture pairs allow tightening or loosening of the corresponding screws after plate 68 is secured in place by a pair of screws 80a and 80b that pass through respective end apertures 82a and 82b and engage corresponding threaded bores in molded housing columns 84a and 84b, which are adjacent to the inside surfaces of respective end walls 15 and 16 as may be seen best in FIGS. 7 and 9.

The female contact members 60a, 60b, 60c and 60d are preferably made of a flattened metal tube or the like and have prong sockets 62a, 62b, 62c and 62d, respectively, for receiving, electrically engaging and frictionally gripping a male member preferably in the form of a flat prong carried by a function module, such as prongs 88a, 88b, 88c and 88d described below. The transverse shape of the sockets and the prongs correspond to each other and may be oval, square, round or some other interengagable shape that provides the required electrical engaging and frictionally gripping functions. These engaging and gripping functions are preferably provided by making the flattened tubes from a resilient metal. The flat prongs are preferably made from a resilient metal strip. Thus, in the embodiment shown by way of example, the female members are formed by a metal tube that has been flattened into an oval or rectangular shape that is engageable by a flat male prong formed from a short metal strip.

In other words, the flat prongs serve as male electrical contacts and the tubes serve as female electrical contacts which are adapted to receive and mate with the male electrical contacts in a frictional relationship provided by the resilience of these contacts. Each female contact tube is fixed to the inner jaw 40 of the clamping terminal, as at 64, by welding or the like but is not fixed to the outer jaw 38, which is free to move relative to the female contact such that the latter does not interfere with reciprocal movement of the outer jaw relative to the inner jaw during clamping or unclamping of electrical wires placed therebetween. It is also contemplated that these male and female contact members may be reversed, in which case each male contact strip would be fixed to the inner jaw 40 of the clamping terminal, as by welding or the like, but would not be fixed to the outer jaw 38.

When secured in place, intermediate plate 68, sidewalls 13 and 14, and end walls 15 and 16 define an outer compartment 86 for receiving any one of several different function modules, such as a dual outlet module 88, a switch module 90, or a junction box module (not shown) for serving other remote electrical boxes (such remote boxes may be multipurpose boxes according to the present invention or conventional dual outlet boxes and conventional switch boxes or the like). Outlet module 88 has dual female receptacles 89, 89 on one side and three male prongs on the other side, namely prong 88a for a hot connection, prong 88b for a common connection, and prong 88c for a ground connection as shown in FIGS. 5 and 6. Prongs 88a, 88b, and 88c are arranged in spaced relation for insertion through cover slots 70a, 70b, and 70c and into the sockets of corresponding female members 60a, 60b, and 60c, respectively. Switch module 90 has a switch toggle 91 on one side and three male prongs on the other side, namely, a prong 90a for a hot connection, a prong 90c for a ground connection and prong 90d for an auxiliary connection as shown in FIGS. 3 and 4. Prongs 90a, 90c and 90d are arranged in spaced relation for insertion through cover slots 70a, 70c and 70d and into the sockets of female members 60a, 60c and 60d, respectively.

As a comparison of FIGS. 4 and 6 will show, the prongs of switch module 90 are arranged differently from those of outlet module 88. In the wiring for a light switch, such as shown by way of example for switch module 90 in FIG. 11, a light fixture (not shown) associated with the switch is wired directly to a common circuit via an input wire 92 from a circuit breaker panel (not shown) to common terminal clamp 32 and an output wire 93 from common terminal clamp 32 to the light fixture, so that no common prong is required on the light switch module 90. Instead of a common prong, switch module 90 has an auxiliary prong 90d connected to an auxiliary wire 96 via auxiliary terminal 34. The switch module 90 also has a hot prong 90a connected to a hot wire 95 via hot terminal 30 and a ground prong 90c connected to a ground wire 94 via ground terminal 36. Thus in the wiring of switch module 90, all four clamping terminals are used as required for safely wiring a light switch circuit. In contrast to this, the dual outlet module 88 may utilize only three of the clamping terminals, namely, the hot terminal 30 as engaged by prong 88a, the common terminal 32 as engaged by prong 88b, and the ground terminal 36 as engaged by prong 88c.

Preferably, the resilient frictional grip of multiple female members on the multiple male prongs of each function module is alone sufficient to retain an installed module in place within the outer compartment 86 of housing 12. However, a cover member 87 may be placed over, but is preferably integrally molded to, the module's outer face for esthetics. Cover member 87 is secured in place by a pair of screws 71a and 71b that pass through corresponding apertures in the cover member and engage a corresponding pair of ears 73a and 73b at the front of end walls 15 and 16 of box housing 12 as shown by way of example in FIG. 3. Although not required, the use of covers similar to cover 87 for all of the function modules, but with appropriate access cutouts, will insure retention of each module within the box 10. Thus, a similar cover (not shown) for the outlet module 88 would have cutouts allowing access to the plug receptacles 89, 89 in the same manner as covers for conventional dual outlets. As a further alternative, the outlet module 88 may have a pair of ears 73c and 73d adjacent its front face as shown in FIG. 6 for attachment by screws 71a and 71b that would pass through corresponding apertures in the ears 73c and 73d and engage the corresponding pair of ears 73a and 73b at the front of housing end walls 15 and 16. In this alternative, the front face 83 of module 88 preferably has a threaded hole 85 for screw attachment of a conventional cover for dual outlets.

Also preferably provided are a plurality of four mounting ears for mounting the box 10 on a stud or another frame member of a house or other building structure, namely ears 75a and 75b at opposite edges of end wall 15 and ears 77a and 77b at opposite edges of end wall 16. Each of these ears has an aperture 79 through which a nail or screw may be passed to engage the stud or other frame member against which one of the sidewalls 13 and 14 has been positioned, and thereby attach the housing 12 to this stud or frame member.

Figure 15:
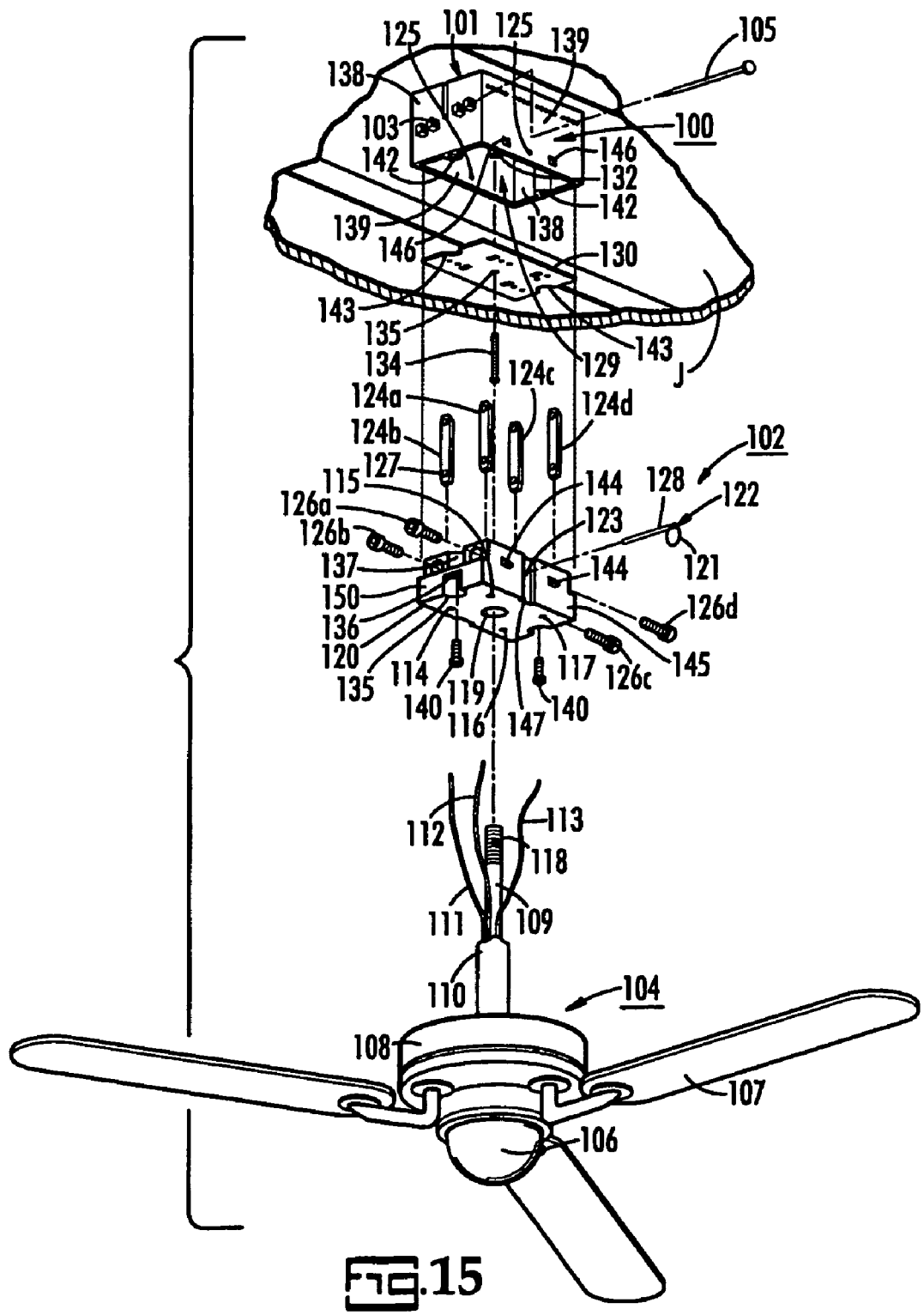
FIG. 15 is a respective elevational exploded view showing a modified multipurpose electrical connection box in combination with a speciality module for mounting and electrically connecting a ceiling fan and light unit, all according to a modification of the invention.

Referring now to FIG. 15, there is shown a modification of the invention wherein a ceiling mounted connection box, generally designated 100, receives and supports a specialty module 102 for electrically connecting and physically mounting a ceiling fan and light fixture 104 having a covered light component 106 and a motor 108 for driving a plurality of fan blades 107. The fixture 104 also includes a plurality of electrical wires 111, 112 and 113 and a threaded mounting rod 109 having a locking aperture 118, the purpose of which is described below. Rod 109 and the electrical wires may be covered by an esthetic sheath 110. A connection box housing 101 is fastened to a ceiling joist J by a pair of nails 105 (only one is shown) that pass through a plurality of apertured bosses 103 on the outer surface of housing end walls 138, 138.

The module 102 is held in an outer compartment 129 of housing 101 by a plurality of detents 144 that project from its opposite sidewalls 145, 145 and are arranged to snap into corresponding apertures 146, 146 in opposite sidewalls 139, 139 of the housing 101. These housing sidewalls are sufficiently resilient to cause the projecting detents to snap into and engage the apertures when an adjacent portion of the wall is forced aside by forcibly inserting and seating the module 102 within the outer compartment 129. Instead of apertures that pass entirely through the sidewalls, the sidewalls 139 may be formed with recesses arranged for detents 144 to snap into and engage, thereby also detachably securing module 102 in compartment 129. Another alternative is that the detents may be located on the module end walls 150, 150 and the corresponding apertures or recesses located on the housing end walls 138, 138.

In a manner somewhat similar to its attachment, the module 102 may be detached from the housing 101 and removed from compartment 129 by inserting a tool with a flat or wedged-shaped head, such as a screwdriver, between the housing sidewall 139 and the module sidewall 145 and moving the tool to flex a portion of the resilient housing sidewall by an amount sufficient to release a nearby detent from engagement with its corresponding aperture or recess. Tool slots 147,147 in module sidewalls 145, 145 are preferably provided to facilitate inserting the head of a tool for removing the module 102 from its compartment 129, as may be needed for its replacement or repair, or for substituting a different type of module having a different function, such as a switch or outlet.

Prior to inserting the module into the housing, the ceiling fixture 104 is mounted on the module 102 by screwing the threaded rod 109 into the threaded module aperture 119. Further mounting support is provided by a pair of screws 140, 140 that pass through corresponding apertures 149, 149 in a pair of module webs 136, 136 at the base of a pair of screw and tool receiving channels 135, 135. The threads of screws 140, 140 engage threaded apertures in a pair of columns 142, 142, one inside each of the housing end walls 138, 138 and preferably formed integrally therewith, to securely fasten the module to the housing. As may be seen best in FIGS. 15 and 19, an inner wall portion 151 of end wall 150 of module body 160 is stepped inward to provide ledges 152, 152 that engage the housing end walls 138, 138 when the module is seated in outer compartment 129. Channels 137, 137 in inner wall portions 151, 151 are shaped to receive upper segments of the respective housing columns 142, 142 during seating of module body 160.

A backup supporting and securing mechanism is provided by a locking key 122 having a handling ring 121 and a shaft 128. After assembly of the fan rod 109 in module aperture 119 and the module 102 in housing 101, shaft 128 of key 122 is inserted through apertures 125,125 in housing sidewalls 139,139, through passages 123,123 in module 102 and through opposing slots 118, 118 in the wall of hollow rod 109 as illustrated in FIG. 22 to provide another positive connecting structure between these components. As may be seen best in FIGS. 19 and 22, the outer ends of module passages 123 preferably terminate at tool slots 147, 147 in module sidewalls 145,145.

Since the connection box and its terminals in FIGS. 15-23 operate in the same way, have the same functionality and a generally similar structure as those described above with reference to FIGS. 1-14, the same numerical designations have been used for similar components in FIGS. 15-23 with the addition of a prime symbol ('), and only the differences will be described hereinafter. The structural details and arrangement of the electrical terminals within internal compartments of the connection box housing 101 may be seen best in FIGS. 16-18. Although this arrangement is similar to the arrangement of the terminals in the housing 12 as seen particularly in FIGS. 2, 7 and 11, there are significant differences. One of these is that auxiliary terminal 34' in FIG. 16 is oriented differently from the corresponding auxiliary terminal 34 in FIG. 7 so that the female member 60d' is mounted on an end surface instead of a side surface of the inner clamping member 40'. This end mounting of the auxiliary female member has the advantage of making all of the terminals 30', 32', 34' and 36' of identical construction for economical manufacture and interchangeability.

Another difference is that the terminal 36' has been oriented 180 degrees relative to terminal 36 so that the entrances to all of the wire guide sets 21', 23', 25' and 27', leading to inner compartments 22', 24', 26' and 28', respectively, are on one sidewall 139 of housing 101. Compartment 24' contains common terminal 32', compartment 22' contains hot terminal 30', compartment 28' contains ground terminal 36', and compartment 26' contains auxiliary terminal 34'. The respective female members 60a', 60b', 60c' and 60d' are the same as previously described in connection with the respective female members 60a, 60b, 60c and 60d of FIGS. 1-14, except that they are each fixed, as by welding at 64' (FIG. 18), to their corresponding lower clamping jaw 40' above a groove G in the side and end surfaces of that jaw. However, where the lips L, L are on the inner compartment sidewalls as shown (instead of the end walls as not shown), this groove optionally may be omitted from the end surfaces of the lower jaws, in which case the female members of FIGS. 15-23 may be the same and secured in the same manner as those of FIGS. 1-14. Each of the female members 60a', 60b', 60c' and 60d' provide a prong receiving socket, such as socket 62b' of member 60b' (FIG. 18).

Figure 18:
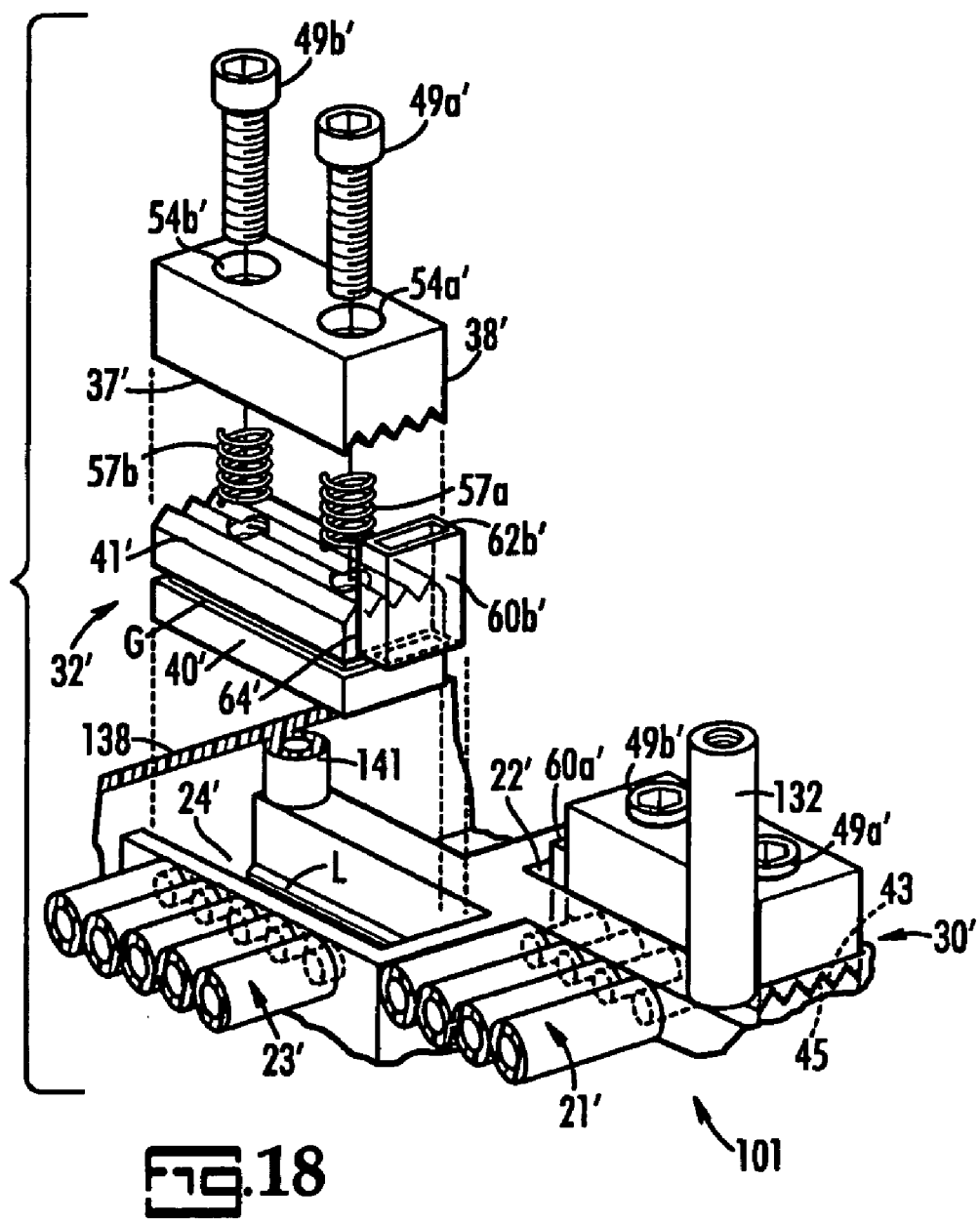
FIG. 18 is a fragmentary exploded perspective view showing details of the electrical terminals of FIG. 17 and the compartments in which they are mounted.

A further difference is that each of the terminals 30', 32', 34' and 36' is firmly secured in its corresponding inner compartment by a pair of resilient lips L, L that project from opposite sidewalls of each inner compartment so as to engage an opposing portion of the inner jaw member 40', which may be the groove G in the side surface of this member as seen best in FIGS. 16, 18 and 23, or may be a relatively flat edge of the inner clamping surface 41' of this member or a relatively flat ledge projecting out from the side surface of this member (not shown). The resiliency of the lips L, L provides a snap locking action after the lips are forced aside by firmly pushing the inner jaw member into its seated position at the bottom of the inner compartment.

The outer jaw member 38' is then attached to the inner jaw member 40' for retention in the inner housing compartment and for reciprocating movements relative thereto in response to tightening or loosening of the screws 49a' and 49b'. These screws pass respectively through smooth bores 54a' and 54b' in outer member 38' and into corresponding threaded bores in inner member 40' as shown in FIG. 18. The clamping action caused by the tightening of these screws is opposed by the bias of springs 57a and 57b as previously illustrated in FIGS. 10 and 12 for similar clamping members 38 and 40. If the terminals ever need to be replaced, they may be removed from the inner compartments by prying the inner jaw member 40' outward past the resilient lips L, L.

Thus, the opposite wall lips L, L for engaging an opposing portion of the inner jaw member 40' provide an alternative fixing means for fixing the inner one of these clamping members (either 40 or 40') securely in its position within the inner or bottom portion of the inner compartment as described above for member 40. In the same manner as housing 12, housing 101 preferably includes a plurality of guide passage sets 21', 23', 25' and 27' each providing multiple wire guide passages extending from the exterior housing surface to a corresponding inner compartment. These passages separately feed and guide the end portions of multiple separate wires from the exterior surface to positions over and adjacent to the inner clamping surface 41' of inner jaw member 40' when the outer clamping surface 37' is in its retracted position along with outer jaw member 38'.

An intermediate plate 130 for covering the electrical terminals, as shown best in FIGS. 15 and 17, is similar to the intermediate cover plate 68 of FIGS. 1-14, except instead of being secured at each end to an end wall column, it is secured to a central post 132 by a screw 134 that passes through a central aperture 135. The intermediate plate 130 has an arcuate cutout 143 at each end for receiving a corresponding one of the two end wall columns 142, 142. When plate 130 is seated against the top of central post 132, the edges of cutouts 143, 143 rest on supporting ledges provided by enlarged inner portions 141 of column 142. With plate 130 in its seated position, module 102 may be secured to the end wall columns by screws 140, 140 that pass through the apertures 149, 149 in the webs 136, 136 at the bottom of channels 135, 135 in the module end walls 150, 150 (FIG. 20).

The tool apertures, such as 74a', 74b' and 72a', 72b', and the contact access apertures, such as 70a' and 70b', in plate 130 are the same as those described above in plate 68, and therefore have the same numerical designations as the corresponding apertures in plate 68, except a prime symbol (') has been added because other structural features of plate 130 differ from those of plate 68. Thus, although only some of the apertures are shown in FIG. 17, the intermediate plate 130 has all of the same apertures, as previously described for the intermediate plate 68, for passing the contact prongs 124a, 124b, 124c and 124d of module 102 and for passing a tool (not shown) for engaging the heads of screws 49a' and 49b' to tighten the outer terminal jaw 38' against the inner terminal jaw 40'.

By reason of this and other similar features, the connection box 100 also may be used for the same purposes as the connection box 10 of FIGS. 1-14, i.e., for mounting and connecting switches, outlet receptacles, wiring junctions and other wall or floor positioned circuit components and fixtures. For example, instead of mounting tabs like 73c and 73d (FIG. 6) or a mounting plate like 87 (FIG. 4), the dual outlet module 88 and the switch module 90 may be provided with the detents 144 for engaging the apertures 146 (or alternative recesses) of the housing 101, which also may be mounted on wall studs or floor joists.

As may be seen best in FIGS. 16 and 17, the wiring of the fan and light fixture 104 utilizes a common wire 97 to a common terminal 32' in an inner compartment 24', a hot wire 95' to a hot terminal 30' in an inner compartment 22', and a ground terminal 94' to a ground terminal 36' in an inner compartment 28'. Since an auxiliary wire is not needed for the fan and light fixture 104 unless it utilizes 220 volts instead of 110 volts, auxiliary terminal 34' in an inner compartment 26' may optionally be used as a junction terminal for interconnecting two other electrical circuits via a pair of wires at 98 and 99. However, if operation of the fan motor 108 of fixture 104 requires 220 volts instead of 110 volts, auxiliary terminal 34' would be used for a fourth wire as required for operating a 220 volt motor.

The manner in which the wires 111, 112 and 113 are connected to the module prongs 124*a*, 124*b* and 124*c* will now be described with reference to FIGS. 15, 19-21B and 23. The body 160 of specialty function module 102 is made of electrically insulating material and provides means for electrically connecting the fixture 104 to metal prongs 124*a*, 124*b*, 124*c* and 124*b* for engaging the respective terminals in the connection box 100. This connecting means comprises corresponding channels 125*a*, 125*b*, 125*c* and 125*b* extending from the top (or interior as installed) surface 154 of body 160 for respectively receiving an inner end portion of these prongs; and corresponding wire passages 114, 115, 116 and 117 in body 160 that extend from the bottom (or exterior as installed) surface 155 thereof to a position adjacent to at least a portion of the corresponding channel. This arrangement allows a wire covered in an electrically insulating sheath, such as wires 111, 112 and 113, to be inserted in each wire passage to a position where a distal end segment thereof is in overlapping relation to the inner prong portion, as seen best in FIGS. 21A and 21B.

Sheath penetrating elements, such as screws 126*a*, 126*b*, 126*c* and 126*d* having a sharp conical point P, are carried in threaded bores of module body 160 that intersect with both the wire passages 114, 115, 116 and 117 and the prong channels 125*a*, 125*b*, 125*c* and 125*b*, as also seen best in FIGS. 21A and 21B. The screws 126*a*, 126*b*, 126*c* and 126*d* are movable in their bores by being rotated therein from a retracted or loosened position (FIG. 21B) to an extended or tightened position (FIG. 21A). The retracted position allows placement of distal end segments of the wires in the aforesaid overlapping relation with the inner prong portions. In the extended position, the pointed ends P of the screws penetrate the wire covering sheaths, pass through the wires and both sides of the sheaths, and firmly engage the inner prong portion to thereby provide electrical contact between the wires and the prongs. To enhance this penetrating action and the electrical contact, the inner end portion of each of the prongs is preferably provided with an aperture 127 for receiving a tip portion of the pointed end P of the screws.

Persons skilled in the art, upon learning of the present disclosure, will recognize that various modifications to the elements, components, and assemblies of the invention are possible without significantly affecting their functions. For example, the number of clamping terminals in the housings 12 and 101 may vary from as little as two to many more than four, and one or more outer level compartments may house two or more function modules having the same function or different functions. Also, the arrangement of the clamping terminals within the housing and the shape of the jaw members may take various forms.

In addition, the number of wire passages leading from the exterior of the housing to each clamping terminal compartment may be as little as two or greater than five, depending upon the number of separate wires needed for the circuits to be connected to each prong of the function module and upon the number of function modules present in the outer level compartment(s). Also, multiple plates may be used to cover one or more of the inner compartments, and various securing means other than screws may be used to secure such cover plates in place within the housings 12 and 101. Various securing means other than nails may be used to secure the housings 12 and 101 to a stud, joist or other framing structure of a building. Furthermore, various securing means other than screws and/or detents and their related engaging structures may be used to secure one or more function modules in one or more outer compartments. Accordingly, while the preferred embodiments have been shown and described in detail by way of example, further modifications and embodiments are possible without departing from the scope of the invention as defined by the claims set forth below.

What is claimed is:

1. A multipurpose connection box for connecting an electrical energy source to at least two different function modules having different electrical functions, said connection box comprising:

a housing providing a space for receiving said function modules one at a time, first receiving means in said housing for applying electrical energy to a first one of said function modules when it is placed in said receiving space, second receiving means in said housing for applying electrical energy to a second one of said function modules when it is placed in said receiving space, a plurality of contact means, said housing comprising a plurality of separate inner compartments each containing a corresponding one of said contact means, and securing means for securing each of said contact means in its corresponding inner compartment;

said first receiving means comprising a first one and a second one of said contact means each for engaging a corresponding contact of said first function module, said second receiving means comprising a third one of said contact means for engaging a corresponding contact of said second function module, one of said first and second contact means being arranged for engaging a corresponding contact of said second function module, each contact means of said first and second receiving means comprising inner and outer clamping members having respective inner and outer clamping surfaces, and means for pressing said clamping members together to bring said clamping surfaces into clamping engagement with at least one electrical wire, and said housing further comprises a plurality of guide passages of which at least one corresponds to each of said inner compartments and extends from an exterior surface of said housing to said corresponding inner compartment for feeding and guiding said at least one electrical wire from said exterior surface to between said clamping surfaces.

2. A connection box according to claim 1, wherein said first and second receiving means each comprises another of said contact means in a corresponding one of said inner compartments for engaging a common contact on each of said first and second function modules.

3. The connection box of claim 1, wherein said module receiving space is within an outer compartment of said housing, and wherein said corresponding inner compartments are arranged in said housing beneath said outer compartment.

4. The connection box of claim 1, wherein said securing means comprises a plate covering access openings into each of said inner compartments; and wherein said plate has apertures providing access to an electrical contact of each of said contact means and to an actuating member of said pressing means for causing and releasing said clamping engagement of the clamping members.

5. The connection box of claim 1, wherein at least one of said function modules is a light switch module.

6. The connection box of claim 1, wherein at least one of said function modules is a dual outlet module.

7. The connection box of claim 1, wherein at least one of said function modules includes means for opening an electrical circuit existing between two contacts thereof.

8. The connection box of claim 1, wherein said first receiving means and said second receiving means each comprise a fourth one of said contact means arranged for engaging a corresponding contact of said first module when it is placed in said receiving space and a corresponding contact of said second module when it is placed in said receiving space.

9. The connection box of claim 1, wherein one of said function modules includes at least two contacts for connecting two electrical circuits when one of said circuits is connected to one of said contact means and the other of said circuits is connected to another of said contact means.

10. A connection box according to claim 1, wherein said securing means comprises fixing means for fixing said inner clamping member in a fixed position within said inner compartment, and attaching means for attaching said outer clamping member to said inner clamping member for reciprocal movement relative thereto; and wherein the clamping surface of said inner clamping member is aligned with an outlet end of said corresponding guide passage to guide an end segment of said electrical wire over and adjacent to said inner clamping surface when said outer clamping surface is in a retracted position.

11. A connection box according to claim 10, wherein said housing further comprises a plurality of sets of said guide passages, each of said sets having multiple guide passages extending from said exterior housing surface to said corresponding inner compartment for separately feeding and guiding multiple separate wires from said exterior surface to between the clamping surfaces of said clamping members, and wherein the clamping surface of said inner clamping member is aligned with outlet ends of said multiple guide passage to guide end segments of said multiple electrical wires over and adjacent to said inner clamping surface when said outer clamping surface is in said retracted position.

12. A connection box according to claim 10, wherein said inner and outer clamping surfaces are serrated with elongated teeth formed by longitudinally extending peaks and valleys, the serrated surface of said clamping members being arranged opposite to each other with the peaks of one serrated surface aligned with the valleys of the other serrated surface, and wherein each of said guide passages is arranged to feed said corresponding wire between said serrated surfaces in a direction transverse to the longitudinal extent of said peaks and valleys.

13. A connection box according to claim 1, wherein each of said contact means comprises a pair of clamping members for clamping therebetween at least one electrical wire, and means for pressing said clamping members together in clamping engagement with said electrical wire; wherein said pressing means comprises at least one actuating member having means for engaging an outer one of said clamping members and means for engaging an inner one of said clamping members so that movement of said actuating member in one direction pulls said clamping members together; and wherein said contact means further comprises resilient means biasing said clamping members apart such that movement of said actuating member in another direction allows said resilient means to push said clamping members apart.

14. The connection box of claim 13, wherein said at least one actuating member is a rotatable member having a head for engaging a shoulder portion of one of said clamping members and a threaded shank for engaging a threaded portion of the other of said clamping members.

15. The connection box of claim 13 wherein said clamping members are elongated so as to clamp more than two electrical wires therebetween, and wherein two actuating members are provided for each of said pairs of clamping members.

16. The connection box of claim 1, wherein said first and second contact means comprise corresponding first and second female electrical contacts adapted and arranged to conductively mate with corresponding first and second male contacts of said first function module.

17. The connection box of claim 16, wherein said third contact means comprises a female electrical contact adapted and arranged to conductively mate with a corresponding male contact of said second module, and wherein one of said first and second female contacts is also adapted and arranged to conductively mate with a corresponding male contact of said second function module.

18. The connection box of claim 1, wherein said securing means comprises means for fixing an inner one of said clamping members to a wall of said inner compartment; and wherein said pressing means connects said inner clamping member to an outer one of said clamping members arranged to reciprocate relative to said inner clamping member for providing said clamping engagement.

19. The connection box of claim 18, wherein said fixing means comprises a lip projecting from said compartment wall and arranged to engage an opposing portion of said inner clamping member with a snap locking action when said lip is forced aside by a seating of said inner clamping member within said inner compartment.

20. The connection box of claim 19, wherein said inner compartment comprises opposing sidewalls each having one of said projecting lips, and wherein said inner clamping member has a pair of grooves one on each of two side surfaces thereof, each of said projecting lips being arranged to engage a corresponding one of said grooves with said snap locking action.

21. The connection box of claim 18, wherein said fixing means comprises a pair of lips each projecting from a corresponding compartment wall and arranged to engage an opposing portion of said inner clamping member with a snap locking action when said lip is forced aside by a seating of said inner clamping member within said inner compartment.

22. The connection box of claim 1, wherein said module receiving space is within an outer compartment of said housing, wherein said corresponding inner compartments are arranged in said housing beneath said outer compartment, wherein at least one of said modules includes a detent projecting from a side thereof and arranged to engage an aperture or recess in an adjacent wall of said outer compartment of the housing to detachably secure said one module within said outer compartment, and wherein said housing wall is sufficiently resilient to cause said projecting detent to snap into said aperture or recess when a portion of said wall is forced aside by a seating of said one module within said outer compartment.

23. The connection box of claim 22, wherein said one module includes a plurality of said detents and one or more adjacent walls of said outer compartment have corresponding apertures or recesses arranged to provide said engagement for detachably securing said one module within said outer compartment.

24. A multipurpose connection box for connecting an electrical energy source to at least one function module having a desired electrical function, said connection box comprising:
   a housing having an outer compartment for receiving said function module,
   receiving means in said housing for applying electrical energy to said function module when it is placed in said outer compartment,
   a plurality of contact means each for engaging a corresponding contact of said function module, said housing comprising a plurality of separate inner compartments each arranged in said housing beneath said outer compartment and containing a corresponding one of said contact means, and
   securing means for securing each of said contact means in its corresponding inner compartment;
   each of said contact means comprising a pair of clamping members for clamping therebetween at least one electrical wire, and means for pressing said clamping members together in clamping engagement with said electrical wire,
   and said securing means comprising means for fixing an inner one of said clamping members between opposing walls of said inner compartment, said fixing means comprising opposing lips each projecting from one of said opposing compartment walls and arranged to engage an opposite portion of said inner clamping member with a snap locking action after being forced aside by a seating of said inner clamping member within said inner compartment.

25. The connection box of claim 24, wherein said opposite member portion comprises a groove in a surface of said inner clamping member opposite to a corresponding one of said lips when said inner clamping member is seated within said inner compartment.

26. A fixture mounting unit comprising a function module having means for supporting an electrical fixture and means for providing electrical energy to said fixture, and a connection box for connecting an electrical energy source to said function module, said connection box comprising:
   a housing having an outer compartment for receiving said function module,
   receiving means in said housing for applying electrical energy to said function module when it is placed in said outer compartment,
   a plurality of contact means each for engaging a corresponding contact of said function module, said housing comprising a plurality of separate inner compartments each arranged in said housing beneath said outer compartment and containing a corresponding one of said contact means, and
   securing means for securing each of said contact means in its corresponding inner compartment;
   wherein said housing further comprises one or more apertures or recesses arranged in one or more walls of said outer compartment for engaging one or more detents each projecting from a surface of said function module to detachably secure said module within said outer compartment, said one or more housing walls being sufficiently resilient to cause said projecting detent to snap into said aperture or recess when a portion of said wall is forced aside by a seating of said module within said outer compartment.

27. The connection box of claim 26, wherein said outer compartment comprises opposing walls each of which has one or more of said apertures or recesses for providing said engagement with one or more detents projecting from a corresponding surface of said function module.

28. The connection box of claim 26, wherein said supporting means is for supporting a ceiling fan fixture and said function module includes means for electrically connecting said fan fixture to contacts for engaging said contact means in the connection box, and wherein said connection box housing comprises means for mounting it on a ceiling structural component.

29. The connection box of claim 26, wherein said supporting means is for supporting a ceiling light fixture and said function module includes means for electrically connecting said light fixture to contacts for engaging said contact means in the connection box, and wherein said connection box housing comprises means for mounting it on a ceiling structural component.

30. The connection box of claim 26, wherein said function module comprises a body of electrically insulating material having means for electrically connecting said fixture to said contact for engaging the contact means in the connection box, said connecting means comprising a channel in said body for receiving an inner end portion of said contact, a passage in said body extending from an exterior surface thereof to a position adjacent to at least a portion of said channel such that a wire covered in a sheath may be inserted in said passage to place a distal end segment of the wire in overlapping relation to said contact end portion, and a sheath penetrating element carried in a bore of said body that intersects said passage, said element being movable in said bore from a retracted position allowing placement of said distal end segment in said overlapping relation to an extended position in which an inner end of said element penetrates said sheath and contacts said distal end segment and said contact end portion to provide electrical contact between said wire and said contact.

* * * * *